UNITED STATES PATENT OFFICE.

AUGUST FOELSING, OF DUSSELDORF, GERMANY.

PROCESS OF PURIFYING TANNIN SOLUTIONS BY ELECTROLYSIS.

SPECIFICATION forming part of Letters Patent No. 462,694, dated November 10, 1891.

Application filed April 23, 1891. Serial No. 390,122. (No specimens.)

*To all whom it may concern:*

Be it known that I, AUGUST FOELSING, a subject of the German Emperor, residing at Dusseldorf, in Germany, have invented a new and Improved Process of Purifying and Decoloring Tannin Solutions by Electrolysis, of which the following is a specification.

This invention relates to an electric process of clarifying and decoloring tannic solutions, such as extracts derived from chestnuts, pine-bark, willow, myrobolan, quercitron, mimosa, divi-divi, sumac, oak-bark, oak-wood, &c.

The tannic solution is brought to 4° Baumé at 17.5° centigrade, and is poured into a vessel. Here it is mixed separately with solutions of oxalic acid and chloride of sodium. To one thousand liters of the tannic solution five hundred grams of oxalic acid at 4° Baumé and two kilograms of chloride of sodium should be added. The mixture thus obtained is heated to 60° centigrade and is subjected to electrolization. The electric current produced by a small dynamo in passing through the solution causes an electrolytic decomposition of the oxalic acid and the chloride of sodium and produces a voluminous deposit composed, principally, of resins, coloring-matters, and cellulose—*i. e.*, of non-tannates. The strength of the current depends upon the quantity of the liquid to be clarified. For ten thousand liters of the liquid at 4° Baumé at a temperature of 50° centigrade a current of about two ampéres and about fourteen volts is necessary. The strength of the current should, however, be in inverse ratio to the time employed during the process—that is, the quicker the clarification is to take place the stronger must the current be. The electrodes are composed of platinum, and have the shape of a wire-netting stretched over a wooden frame. For the clarification of ten thousand liters of liquid their height is about one meter and fifty centimeters and their width is about one meter. The weight of each electrode, exclusive of frame—*i. e.*, the platinum alone—is about five hundred grams. The distance between the electrodes is about three meters.

What I claim is—

The improved process of clarifying and decoloring ooze, which consists in mixing a tannic solution with oxalic acid and chloride of sodium and subjecting the mixture to electrolyzation, substantially as specified.

In testimony whereof I have signed this specification in the presence of two subscribing witnesses.

AUGUST FOELSING.

Witnesses:
 HANS FRIEDRICH,
 THEODOR MAYER.